United States Patent
Gracia et al.

(10) Patent No.: US 10,959,570 B2
(45) Date of Patent: Mar. 30, 2021

(54) APPARATUS AND METHOD FOR HEATING AND COOKING FOOD USING LASER BEAMS AND ELECTROMAGNETIC RADIATION

(71) Applicant: NATURAL MACHINES, INC., Dover, DE (US)

(72) Inventors: Alvar Gracia, Barcelona (ES); Emilio Sepulveda, Barcelona (ES)

(73) Assignee: NATURAL MACHINES, INC., Dover, DE (US)

(*) Notice: Subject to any disclaimer, the term of this patent is extended or adjusted under 35 U.S.C. 154(b) by 266 days.

(21) Appl. No.: 15/512,928

(22) PCT Filed: Sep. 22, 2015

(86) PCT No.: PCT/US2015/051431
§ 371 (c)(1),
(2) Date: Mar. 21, 2017

(87) PCT Pub. No.: WO2016/053681
PCT Pub. Date: Apr. 7, 2016

(65) Prior Publication Data
US 2017/0245682 A1    Aug. 31, 2017

Related U.S. Application Data (60) Provisional application No. 62/057,061, filed on Sep. 29, 2014.

(51) Int. Cl.
*A47J 37/06*    (2006.01)
*A23L 5/10*    (2016.01)
(Continued)

(52) U.S. Cl.
CPC ............ *A47J 37/0635* (2013.01); *A23L 5/10* (2016.08); *A23L 5/15* (2016.08); *A23L 5/30* (2016.08);
(Continued)

(58) Field of Classification Search
None
See application file for complete search history.

(56) References Cited

U.S. PATENT DOCUMENTS

| | | | |
|---|---|---|---|
| 5,893,051 A | 4/1999 | Tomohiro | |
| 6,280,785 B1* | 8/2001 | Yang | A21C 11/163 425/112 |

(Continued)

FOREIGN PATENT DOCUMENTS

| | | |
|---|---|---|
| CN | 1159221 A | 9/1997 |
| CN | 102413712 A | 4/2012 |

(Continued)

OTHER PUBLICATIONS

Webster's Encyclopedic Unabridged Dictionary of the English Language, Gramercy Books, New York, NY, p. 321 (Year: 1994).*

(Continued)

*Primary Examiner* — Patricia A George
(74) *Attorney, Agent, or Firm* — Westerman, Hattori, Daniels & Adrian, LLP (57) ABSTRACT

A heating and cooking apparatus inside the cooking chamber of a 3D food printer includes a laser cooking apparatus controlled by a processor implementing particular computer program instructions specific to the operation of the heating and cooking apparatus. The laser cooking apparatus includes at least one laser system with at least one laser beam able to heat the food product to its cooking temperature. Each laser system provides two or more laser beams, each of which can be deflected and focused into the food product with a beam (Continued)

spot of adjustable diameter. The heating and cooking apparatus also can include an electromagnetic radiation heating apparatus that is controlled by the processor and emits electromagnetic radiation to warm the food product inside the cooking chamber to a temperature below its cooking temperature.

10 Claims, 6 Drawing Sheets

(51) Int. Cl.
*A23L 5/30* (2016.01)
*B33Y 10/00* (2015.01)
*B33Y 30/00* (2015.01)
*A23P 20/20* (2016.01)
*H05B 3/00* (2006.01)
*H05B 6/64* (2006.01)
*A23P 20/25* (2016.01)

(52) U.S. Cl.
CPC ............. *A23L 5/34* (2016.08); *A23P 20/20* (2016.08); *B33Y 10/00* (2014.12); *B33Y 30/00* (2014.12); *H05B 3/0076* (2013.01); *H05B 6/6482* (2013.01); *A23P 2020/253* (2016.08); *A23V 2002/00* (2013.01)

(56) References Cited

U.S. PATENT DOCUMENTS

| | | | |
|---|---|---|---|
| 2008/0124433 A1 | 5/2008 | Yelden et al. | |
| 2008/0282901 A1 | 11/2008 | Muchnik | |
| 2011/0002677 A1 | 1/2011 | Cochran et al. | |
| 2013/0344208 A1 | 12/2013 | Singh | |
| 2016/0135493 A1 | 5/2016 | Kuo et al. | |

FOREIGN PATENT DOCUMENTS

| | | |
|---|---|---|
| CN | 103460795 A | 12/2013 |
| JP | 63-3131 A | 1/1988 |
| JP | 2002-147762 A | 5/2002 |
| JP | 2008-534900 A | 8/2008 |
| JP | 2012-519826 A | 8/2012 |
| WO | 2006/102552 A1 | 9/2006 |
| WO | 2010/102261 A1 | 9/2010 |
| WO | 2014/190168 A1 | 11/2014 |

OTHER PUBLICATIONS

Zoran et al., Cornucopia: The Concept of Digital Gastronomy, Leonardo, vol. 44, No. 5, pp. 425-431, Oct. 2011, cited in ISR.
International Search Report dated Dec. 11, 2015, issued in counterpart International Application No. PCT/US2015/051431 (2 pages, including coversheet).
Extended Search Report dated Mar. 21, 2018, issued in counterpart European Application No. 15847070.8 (8 pages).
Office Action dated Dec. 5, 2018, issued in counterpart European Application No. 15847070.8. (4 pages).
Office Action dated Dec. 19, 2018, issued in counterpart Taiwanese Application No. 104131852, with English translation. (22 pages).
Search Report dated Dec. 11, 2018, issued in counterpart Taiwanese Application No. 104131852, with English translation. (2 pages).
Office Action dated May 20, 2019, issued in TW Application No. 104131852, with English translation. (7 pages).
Office Action dated Sep. 27, 2020, issued in counterpart CN Application No. 201580052544.5, with English Translation. (19 pages).
Office Action dated Apr. 28, 2020, issued in counterpart JP application No. 2017-516129, with English translation. (6 pages).
Office Action dated Apr. 15, 2020, issued in counterpart EP application No. 15847070.8. (6 pages).
Office Action dated Nov. 8, 2019, issued in counterpart BR Application No. 112017005995-9. with English translation (5 pages).
Office Action dated Sep. 4, 2019, issued in counterpart TW application No. 104131852, with English translation. (9 pages).
Office Action dated Aug. 27, 2019, issued in counterpart JP application No. 2017-516129, with English translation. (8 pages).
Office Action dated Feb. 7, 2020, issued in counterpart CN application No. 201580052544.5, with English translation. (22 pages).
Chinese Search Report dated Jan. 22, 2020, issued in counterpart application No. 201580052544.5, with English translation. (6 pages).
Office Action dated Jul. 8, 2020, issued in counterpart CA application No. 2,961,394. (5 pages).

\* cited by examiner

APPARATUS AND METHOD FOR HEATING AND COOKING FOOD USING LASER BEAMS AND ELECTROMAGNETIC RADIATION

CROSS-REFERENCE TO RELATED APPLICATIONS

This Application is based on, and claims priority from, U.S. provisional Application No. 62/057,061, filed Sep. 29, 2014, the disclosure of which is incorporated herein by reference in its entirety; and also is related to International Application PCT/US2014/039170, filed May 22, 2014, the disclosure of which is incorporated herein by reference, in its entirety.

COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to apparatus for cooking a food product using laser beams, and optionally for heating the food product to a temperature lower than its cooking temperature, using electromagnetic radiation. A method is also provided to use such cooking and heating apparatus to cook a food product created using an additive manufacturing 3D printing process, cooking the food product layer by layer, and optionally also to warm the food product using electromagnetic radiation.

2. Definitions

The following definitions and terms are used herein:

Food product: any substance consumed to provide nutritional support.

Beam spot: area where a laser beam impinges a surface, which in the context of the present invention, is the surface of a food product or a plate on which the food product is deposited.

Stacked laser array: an array in which at least two lasers are stacked one above the others and connected in phase to increase the power.

3D printing or Additive Manufacturing is a processes of making a three-dimensional object from a 3D model or other electronic data source primarily through additive processes in which successive layers of material are laid down under computer control.

3. Related Art

Some previous patents and published patent applications describe different systems to use lasers in conjunction with cooking.

Japanese Patent Publication No. JP63003131A2 by Terakubo Kiyoshi for a Laser Cooking Device, published on Jan. 8, 1988, describes how to improve thermal efficiency, by utilizing laser beams as a cooking means, where a laser oscillator is used to heat the bottom of a cooker. This device does not heat the food directly with a laser and it employs a laser oscillator to heat the bottom of a cooker.

Japanese Patent Publication No. JP2002147762A2 by Asano Hideki for a Food Cooking Apparatus, published on May 22, 2002, describes a microwave oven that has a semiconductor laser irradiation unit which irradiates a laser beam having a specific wavelength (0.8 μm and 1.5 μm) onto foodstuffs accommodated in a cooking chamber.

U.S. Pat. Publication No. US 20080282901 by Boris Muchnik, published on Nov. 20, 2008, describes a Laser Cooking Apparatus device. Muchnik shows an apparatus and method for cooking food directly with a $CO_2$ laser, which is known to reach a higher temperature compared to other types of laser. The laser beam is directed at a beam splitter, which splits the laser beam in half; and then mirrors are used to focus the beam to either side of the food. The split beam reaches a higher temperature than most types of lasers and thus, most foods will be cooked in less than a second.

US Pat. Publication No. 20130344208 A1 by Inderjit Singh, published on Mar. 11, 2013, describes a method and apparatus for plasma assisted laser cooking of food products. A method and apparatus that can apply laser energy to a food product in order to cook it. This system allows applying energy with a laser emitter very close to the food product. The application of the energy can be controlled according to a profile to generate plasma inside and around the food product during a cooking period. The application of energy can be adjusted according to the feedback from the controlled application of energy to the food product.

BRIEF SUMMARY OF THE INVENTION

It is accordingly an object of the invention to provide a heating and cooking apparatus to carry out a proper heating and cooking process at the required heating temperature for each food product.

It is another object of the invention to provide a heating and cooking apparatus able to cook the food product while it is extruded using 3-D additive manufacturing printing, and to keep it warm.

It is still another object of the invention to provide a heating and cooking apparatus able to cook a whole food product once it has been printed using a 3-D additive manufacturing printing process, and to keep it warm.

Alternatively, the heating and cooking apparatus can be used to cook any type of non-printed food directly introduced into a cooking chamber, and to keep it warm.

It is still another object of the invention to provide a heating and cooking apparatus inside the 3D printer, wherein the heating and cooking apparatus has the ability to heat and cook the food product printed by additive manufacturing, at the required heating temperature for each food product.

It is another object of the invention to provide a heating and cooking apparatus that can replace the heating element(s) in the cooking chamber of any closed structure used for cooking, such as a conventional, convection, or microwave oven.

These and other objects according to the invention are achieved by providing a heating and cooking apparatus inside a cooking chamber, wherein the heating and cooking apparatus includes a laser cooking apparatus and an electromagnetic radiation heating apparatus controlled by a computer and a computer program.

More specifically, the apparatus and method in accordance with the present invention warms and cooks a food product, which may be prepared by additive layer manufacturing inside a 3-D printer, using a laser cooking apparatus and an electromagnetic radiation heating apparatus. The warming and cooking process can be carried out either while the food product is being printed or once the food product has been printed by additive layer manufacturing, in which case the cooking process is equivalent to that used for a non-printed (already prepared) food product (non 3D printer use).

The cooking chamber can be the interior of the 3D food printer, in particular a 3D food printer that uses the additive manufacturing method to print a food product using a plurality of ingredients in a process defined by a set of directions, wherein each of the ingredients is contained in a respective capsule and has a plurality of ingredient parameters and rheological properties associated therewith. Alternatively, the cooking chamber can be provided in any closed structure used for cooking, such as a conventional, convection, or microwave oven.

The laser cooking apparatus includes at least one laser system able to cook the food product using at least one laser beam to heat the food product to its cooking temperature.

Each laser system includes either a single laser or at least two lasers in a stacked array. In the case that the laser system includes only one laser, the laser system may also include optical elements for splitting the laser beam emitted by the laser into two or more laser beams.

Each laser system includes a mirror system to deflect and focus the at least one laser beam into the food product.

Each laser system also includes lenses to change the diameter of the beam spot of the at least one laser beam.

Where the at least one laser system has more than one laser, the lasers can have the same wavelength, or they can have different wavelengths in order to heat the food product to its cooking temperature.

The heating and cooking apparatus also can include an optional electromagnetic radiation heating apparatus that emits electromagnetic radiation in the infrared ("IR") and/or microwave spectra, to warm the food product inside the cooking chamber to a temperature below its cooking temperature, for example, to bring the food product to a serving temperature or to aid in the cooking process.

The heating and cooking apparatus is controlled by a processor implementing particular computer program instructions specific to the operation of the heating and cooking apparatus. Different apparatus parameters such as the focus of the laser beam, beam spot diameter of the laser beam, frequency, power, speed of the laser beam, etc. can be controlled by the computer program. The computer program uses the information concerning the composition of the capsule and the capsule content (ingredients of the food product). These adjustments allow a proper heating and cooking process of the food product at the required temperatures.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below in part with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The programmable data processing apparatus would include typical components such as a bus for communicating information, and a processor coupled with the bus for processing information, random access memory coupled to the bus for storing information and instructions to be executed by the processor. Random Access Memory also may be used for storing temporary variables or other intermediate information during execution of instructions by the processor, a read only memory coupled to the bus for storing static information and instructions for the processor, and a data storage device coupled to the bus for storing information and instructions. Also the system may be coupled via the bus to a display device, such as an LCD monitor or panel, for displaying information to a user. The programmable data processing apparatus further includes a keyboard and a cursor control, or a keypad.

It is to be understood that the present invention is not limited to the illustrated user interfaces or to the order of the user interfaces described herein. Various types and styles of user interfaces may be used in accordance with the present invention without limitation.

The invention will be described hereinafter in connection with a 3D printer P that uses the additive manufacturing method to print a food product using a plurality of ingredients in a process defined by a set of directions, wherein each of the ingredients is contained in a respective capsule and has a plurality of ingredient parameters and rheological properties associated therewith. "Ingredient" is used hereinafter in describing the operation of a 3D printer in the production of a food product according to a recipe, via an additive manufacturing method. The 3D printer P has a plurality of capsule holders, each of which is configured to have an ingredient-containing removable capsules inserted therein and includes a heating device for adjusting the temperature of the ingredient contained in the capsule inserted in the capsule holder, based on the ingredient parameters and properties associated with the ingredient and the directions. Such a 3D food printer is described in the afore-mentioned International Patent Appl. No. PCT/US2014/039170. However, as will be appreciated by those of skill in the art, the invention can also be used in connection with any oven, that is, any device with a closed structure that is used as a heating chamber for heating and cooking food.

The ingredient parameters include, but are not limited to printing temperature, heating curve, extrusion speed, extrusion multiplier, waiting time between layer deposition, axis speed, optimal nozzle diameter, vertical precision, horizontal precision, viscosity curve, density, freezing temperature, melting temperature, etc., and define how the 3D printer P handles the ingredient associated with the ingredient parameters. The rheological properties of the ingredients can readily be determined by a person with ordinary skill in the technology.

The heating and cooking apparatus in accordance with the present invention comprises a cooking chamber in which a food product to be cooked is located, laser cooking apparatus for generating at least one laser beam to heat the food product to its cooking temperature, infrared radiation heating apparatus for generating infrared radiation to warm the food product to a temperature below its cooking temperature, and programmable data processing apparatus for controlling the laser cooking apparatus and the electromagnetic radiation heating apparatus. It is noted that for purposes of this disclosure, "heating" and "warming" and their variants (for example, "heat" and "warm") are considered to be synonymous, and may be used interchangeably herein.

Figure 1:
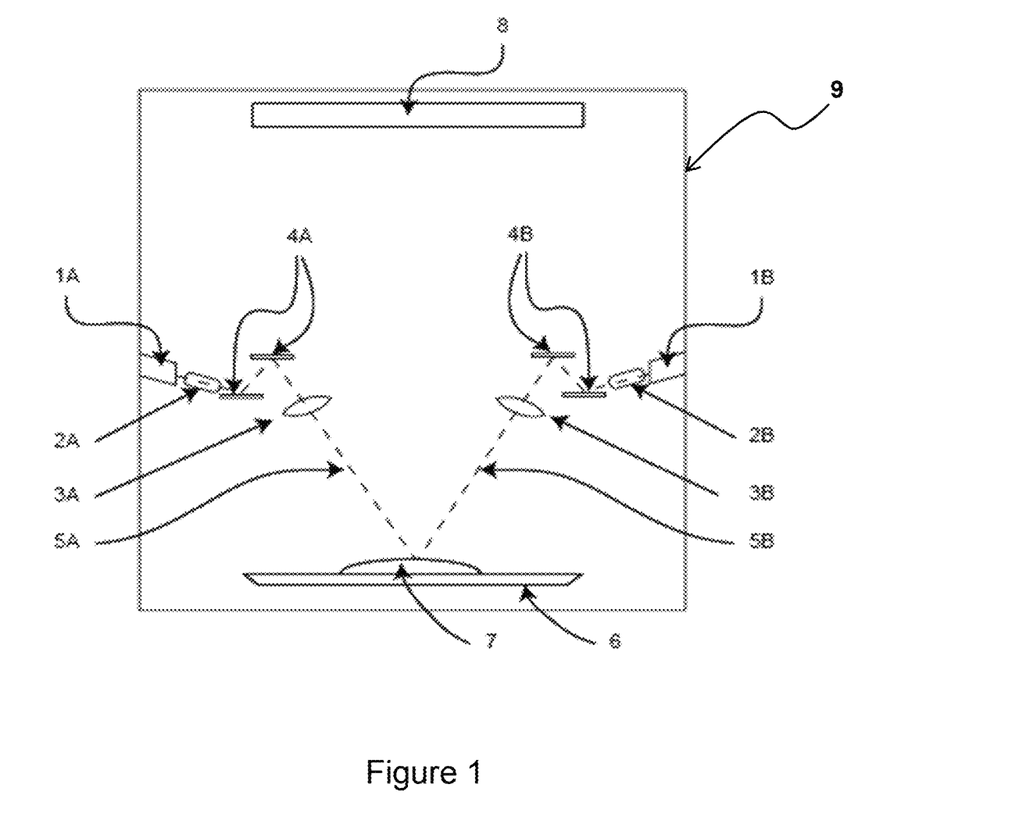
FIG. 1 is a schematic view of the operative elements (laser systems and electromagnetic radiation emitter) of a heating and cooking apparatus, inside a cooking chamber, in accordance with the present invention.
Figure 2:
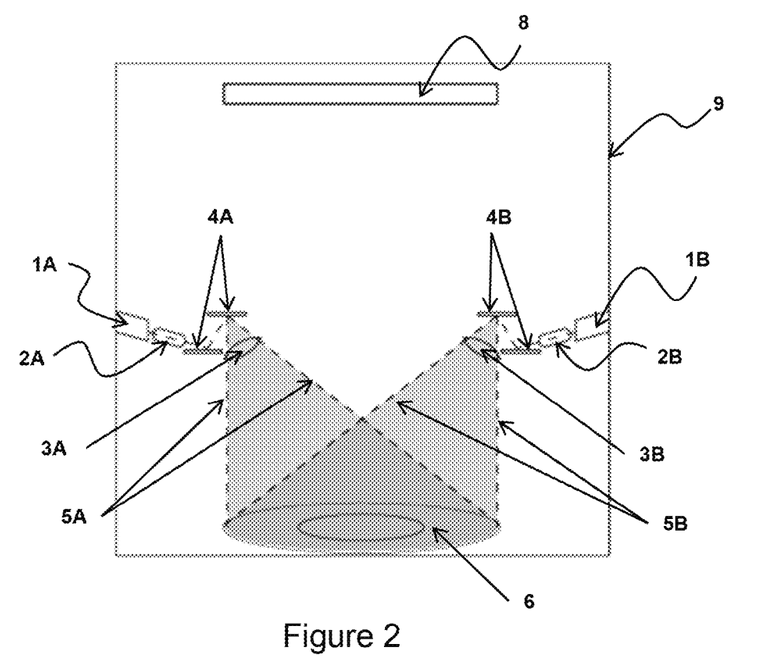
FIG. 2 is a graphic illustration of the scope of movements that the laser systems can perform inside the cooking chamber.
Figure 3:
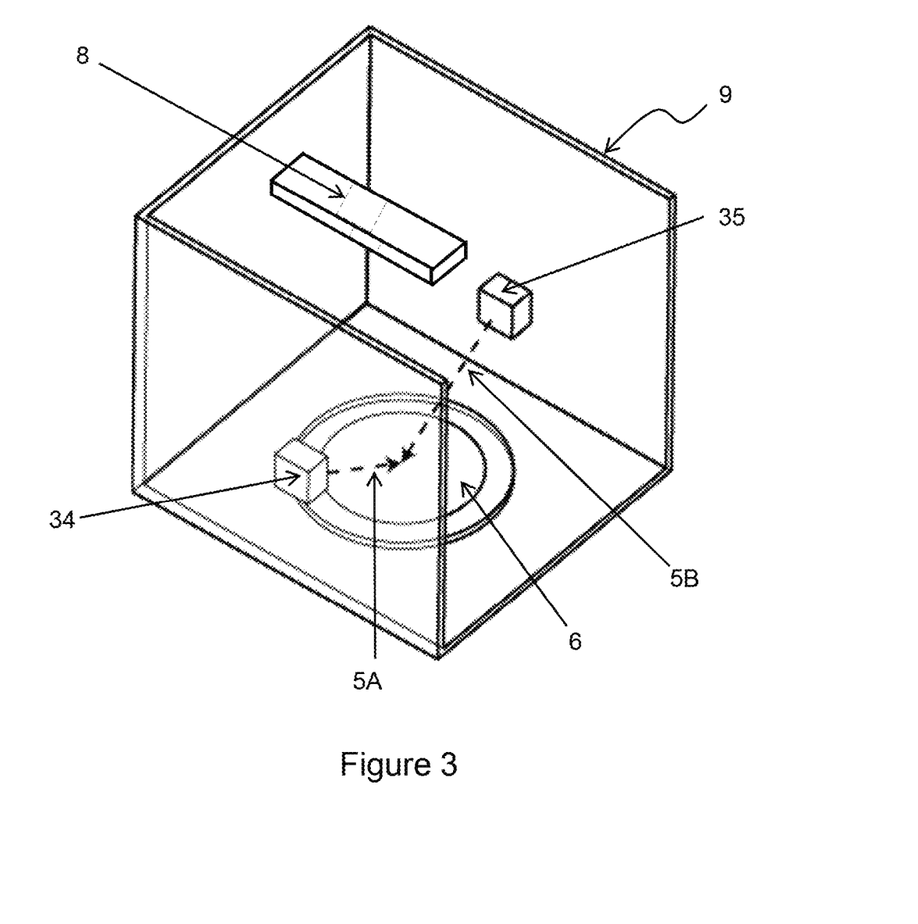
FIG. 3 shows a schematic isometric view of laser systems inside the cooking chamber.

Referring to FIGS. 1 and 2, the interior of the 3D printer P, which serves as the cooking chamber 9, includes a plate 6 having a planar surface where the food product 7 prepared by additive layer manufacturing is deposited. In one embodiment of the invention, the plate 6 is able to absorb infrared light, and does not reflect electromagnetic radiation such as infrared or microwave radiation. However, it will be understood by those of skill in the art that the plate 6 is not required to have these characteristics in order for the heating and cooking apparatus to function as intended.

The laser cooking apparatus includes at least one laser system located inside the cooking chamber 9 of the 3D printer P, and each laser system includes at least one laser. The present invention allows a food product to be cooked by using the at least one laser beam generated by the at least one laser system, to heat the food product to its cooking temperature. In the accompanying drawings, the components of the laser system are designated by reference numbers 1-5, the reference numbers associated with each laser cooking system being followed by a respective letter A or B. The at least one laser system is controlled by computer program instructions of the programmable data processing apparatus, which manages apparatus parameters to ensure an appropriate heating and cooking process, as described hereinafter.

Figure 4:
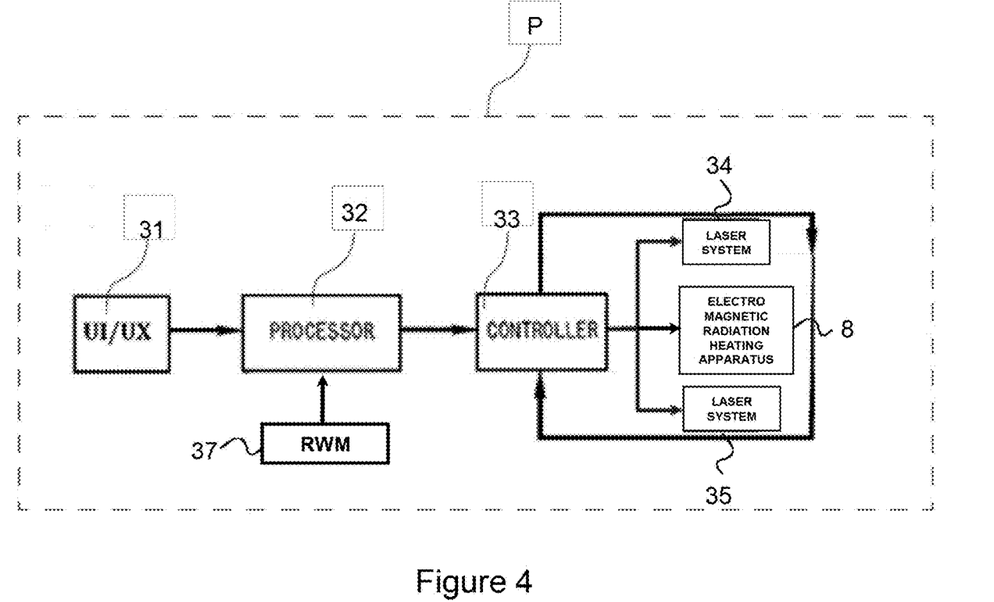
FIG. 4 is a block diagram showing the operative elements of the heating and cooking apparatus of FIG. 1, and the architecture of programmable data processing apparatus which controls the laser cooking apparatus and the electromagnetic radiation heating apparatus.

Referring now to FIG. 4, the programmable data processing apparatus, which is included in the 3D printer P, includes a processor 32 for executing the specific computer program instructions and a controller 33 for controlling the at least one laser system according to specific computer program instructions of the heating and cooking apparatus stored in a read-write memory (RWM). Data used by the computer program instructions of the heating and cooking apparatus for managing the at least one laser system can also be stored in a RWM 37. The end user can enter data and instructions via a user interface 15. Preferably, the processor 32 is embedded as part of the 3D printer P, but the 3D printer P can be configured to allow a user's external device (for example, a computer or tablet) to communicate with the processor 32, so that the user can control the at least one laser system of the heating and cooking apparatus via his or her own device.

The computer program instructions manage the specific apparatus parameters and physical conditions of the laser cooking systems in order to guarantee an appropriate heating and cooking process of the food. The main apparatus parameters controlled by the computer program instructions include: laser power, beam spot diameter, deflection speed of the laser beam, frequency of the laser, aim of the laser beam over the precise area of the food product, temperature inside the cooking chamber 9, exposure time, and rate at which the food product is fed out ("printed") from its capsule. Cooking the food product layer by layer can result in different textures, depending on how the at least one laser beam is applied to cook each layer. The computer program instructions therefore adapt the apparatus parameters depending on printing design, and characteristics and components of the food product, in order to determine an appropriate cooking process, which results in a homogeneous texture of the superimposed food layers.

The type of laser can be the same or can be different for each laser system, as well as for each laser in the stacked array of lasers in a particular laser system. Also the lasers of all of the laser systems can emit light of the same wavelength or of different wavelengths; can be applied with the same power or can be applied with different powers; and can be applied at the same frequency or can be applied at different frequencies. Different frequencies preferably are used for cooking different ingredients, for example, where the ingredient in one food-containing capsule has a different main component than the ingredient in another food-containing capsule (mainly water, mainly oil, etc.). Although a single laser can be used for a food product made of different ingredients, the provision of more than one laser makes the cooking process more efficient.

Each laser system has mirror and lens systems as well-known in the art for deflecting the laser beam and controlling the beam spot diameter, respectively, of its at least one laser beam. FIGS. 1 and 2 show exemplary mirror and lens systems comprising two optical lens systems 2 and 3 and a mirror system 4. The optical lens systems 2 and 3 transmit the laser beam 5 and cause it to converge or diverge to control the focus and the beam spot diameter of the laser beam. The beam spot diameter must be adapted to the layer diameter of the printed food product, or the surface and volume of the non-printed food product. The beam spot diameter must be also adapted to the characteristics of the cooking process for each food product. The cooking process is determined by different apparatus parameters, such as: the spot diameter of the laser beam (or beams), the length of time the laser beam is focused in a certain spot, the power applied to the laser system, the pulse frequency of the laser, the electromagnetic wavelength of the laser, and the laser deflection pattern. In the case of the spot diameter, the bigger the laser beam diameter the more dispersion of the laser power and thus the lower cooking temperature applied to the food being cooked.

The first optical lens system 2 is only required if the laser source comprises multiple emitters, and is placed just after the laser 1 to converge the laser beams from the multiple emitters into a single beam. The second optical lens system 3 is placed just after the mirror system 4. The computer program instructions include instructions for controlling both optical lens systems to adjust the spot diameter to achieve the required cooking temperature, which will be determined by the computer program according to which food product is being cooked, based on the thickness of the food product and the final result being pursued (for example, crispy, rare, well-done . . . ). The optical lens systems 2 and 3 are used to adjust the beam spot diameter and focus of the laser beam 5 so that when two or more laser cooking systems are used, their beam spot diameters can be the same or different.

Each exemplary mirror system 4 is placed in the beam path between the two optical lens systems 2 and 3, as shown in FIGS. 1 and 2 (or, in the case that there is only one lens system, between the laser 1 and the optical lens system 3). The mirror system 4 is used to deflect the laser beam 5 in two dimensions so as to guide the beam spot over a precise area of the food product 7 while it is being printed, as well as after it has been printed. The area to which the beam is deflected is determined by the computer program according to which the food product is being cooked, based on the thickness of the food product and the final result being pursued. The mirror system 4 can deflect the laser beam 5 in the volume of the cooking chamber above the printing surface plate 6 as shown in FIG. 2. The spot focus and size of the laser beam 5 are controlled by the lens system 3. Control of the beam spot focus and diameter allow the addition of granular control to the heating and cooking speed and temperature, in that a larger beam spot can speed up the heating and cooking process.

The computer program instructions include instructions for controlling each mirror system 4 to aim and direct the laser beam and to adapt the speed of the beam spot's movement to the printing feed rate. The speed of the laser beam's movement determines the amount of time the food product is exposed to the laser beam, and thus the speed at which the laser beam cooks the food product.

In the case that the apparatus includes only one laser system with only one laser, the laser system also includes optical elements, for example, conventional beam splitters (not shown), for splitting the laser beam emitted by the laser into two or more laser beams. Such conventional beam splitters are taught by Muchnik (U.S. Pat. Publication No. US 20080282901), incorporated herein by reference in its entirety.

If the apparatus includes two or more laser systems, they can be applied all together or singly and using the same or different apparatus parameters and physical conditions, during the heating and cooking process.

The at least two lasers systems can be used at the same time, with the same or different apparatus parameters and physical conditions, or they can be applied only one laser system at a time. If there are two or more laser systems, which laser systems are used at every point in time during the cooking process will be determined by the pattern and speed of the layer printing process and the food ingredient being printed.

The electromagnetic radiation heating apparatus 8, shown in FIGS. 1 and 2) is used to heat the inner volume of the cooking chamber, in order to warm the food product to a temperature lower than its cooking temperature, for example, to bring the food product to a serving temperature or to aid in the cooking process. The electromagnetic radiation heating apparatus 8 is an electromagnetic radiation emitter, for example, an infrared heat lamp.

The electromagnetic radiation heating apparatus can warm the food product while it is being printed as well as once it has been printed. Alternatively, the electromagnetic radiation heating apparatus can be used to warm any type of non-printed food. The electromagnetic radiation heating apparatus can be used by itself, while the laser cooking apparatus is not in use, or at the same time as the laser cooking apparatus.

In the case of a 3D printer, the at least one laser system can be used to cook the food product while it is being printed using additive manufacturing, or to cook the food product once it has been printed by additive manufacturing. The at least one laser system can also be used in a food chamber for the cooking of non-printed food directly introduced into a cooking chamber.

Figure 5:
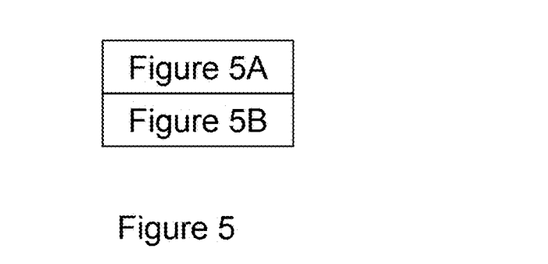
FIG. 5 is a block diagram showing the arrangement of FIGS. 5A and 5B, which together are a logic flow diagram of the steps carried out according to computer program instructions stored in the memory and executed by the processor shown in FIG. 4.
Figure 5A:
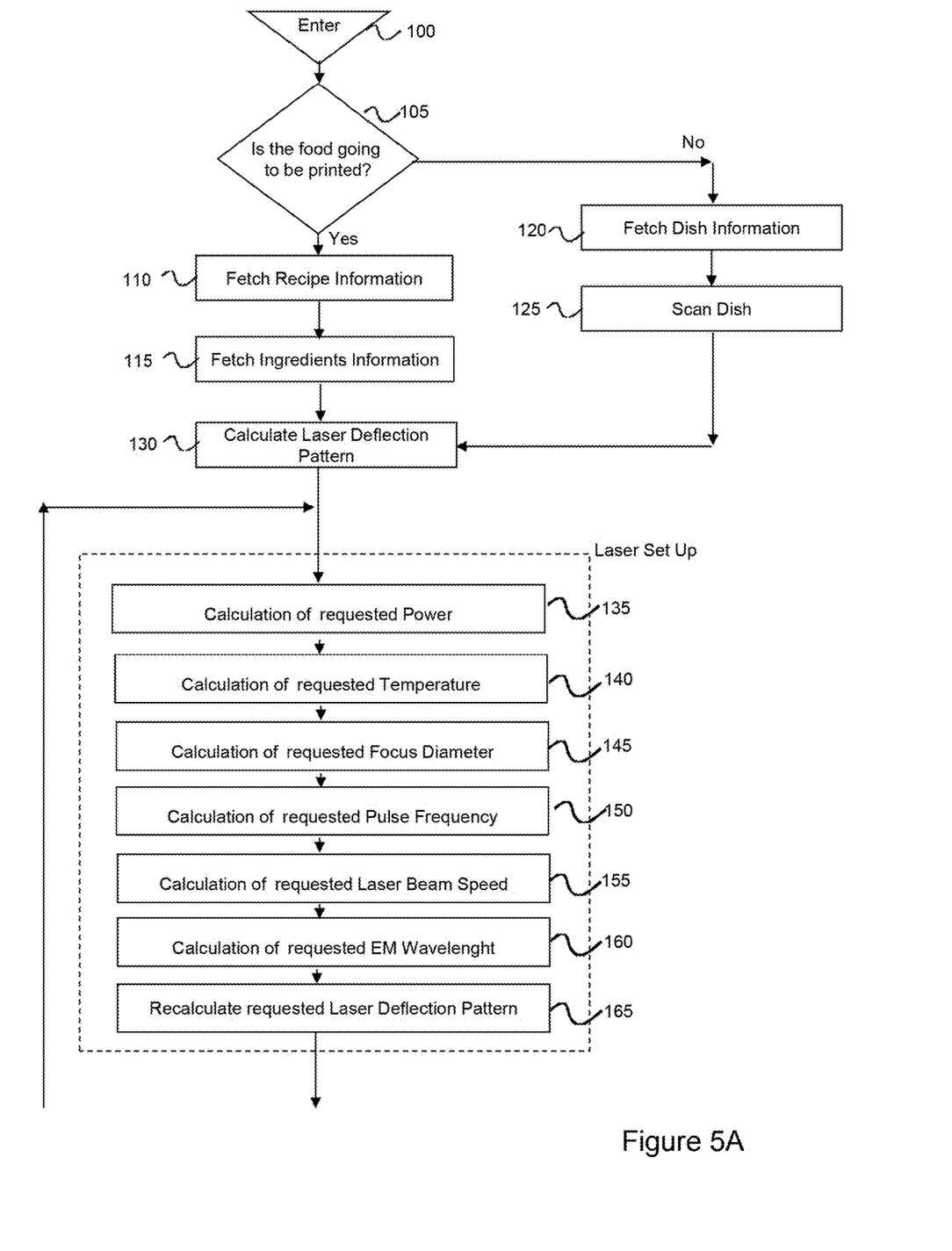
Figure 5B:
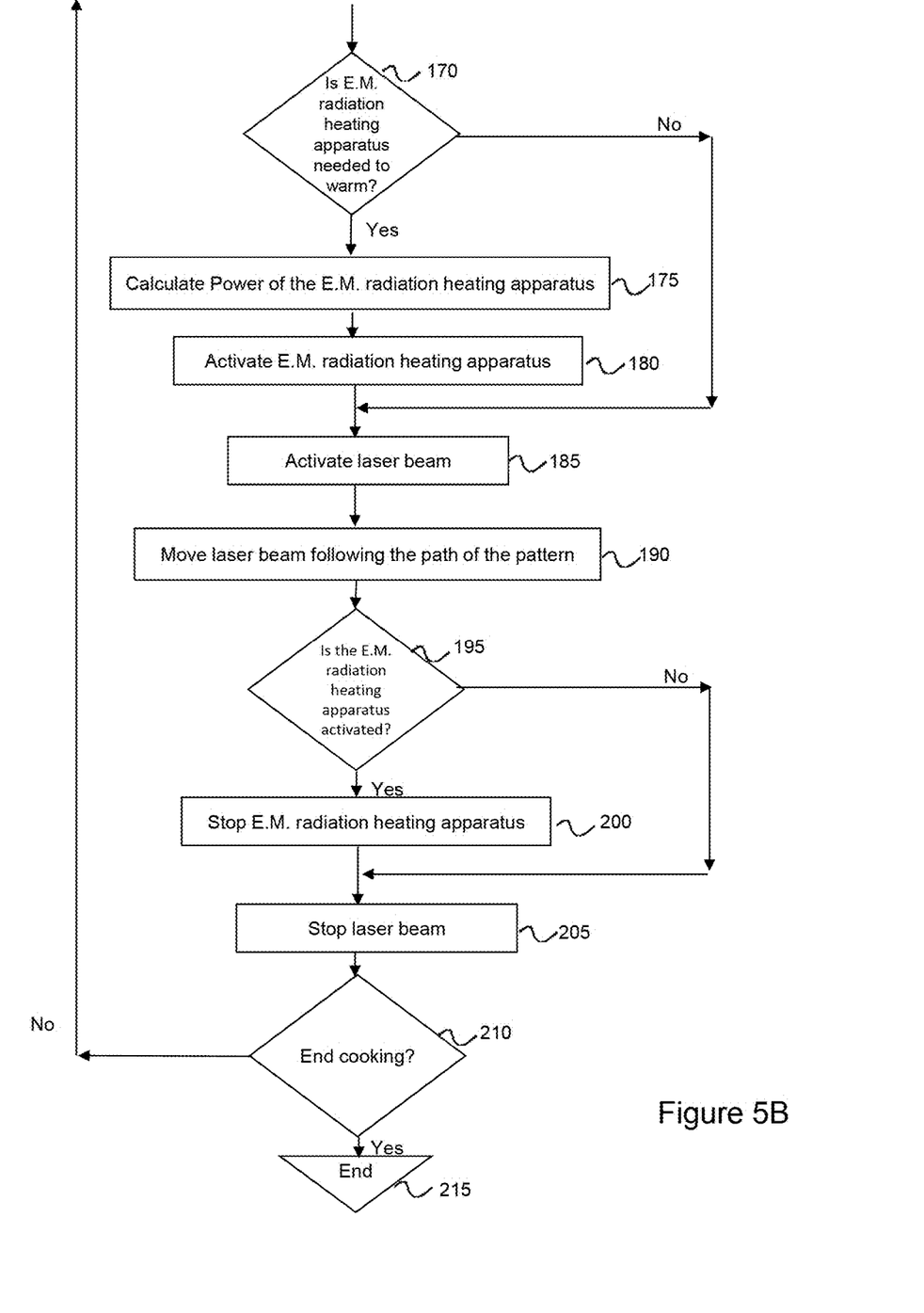

The method of heating and cooking a food product in accordance with the present invention will now be described with reference to the flow chart of FIGS. 5A and 5B. This heating and cooking method is performed based on a heating and cooking process algorithm, which is implemented by computer program instructions stored in the read-write memory (RWM) 37, and can be carried out for both printed and non-printed food 7, present in the cooking chamber 9.

A routine for carrying out the steps of the heating and cooking method is entered, starting at block 100, each time data or a command that involves heating and cooking a food product is entered into processor 32.

A temperature control sub-routine 105 is entered depending if the food product is going to be printed or not.

If the food product is going to be printed, control is transferred from block 105 to block 110. At block 110, the recipe information is fetched from the read-write memory (RWM) 37 of the processor 32 embedded in the printer P. This recipe information includes in which order the ingredients are going to be used in order to prepare the printed food product. From block 110, control is transferred to block 115, where the information related to the ingredient is also fetched from the RWM 37. The information related to the ingredient fetched in block 115 includes the temperature information needed to determine the heating and cooking method. This information fetching step is performed for every ingredient in the printer P.

If the food product is a non-printed food product, control is transferred from block 105 to block 120. At block 120, the ingredient information is fetched from the read-write memory (RWM) 37. This ingredient information includes the main ingredients contain in the food product. From block 120, control is transferred to block 125, where the food product is scanned using a 3D scanner (not shown) controlled by the processor 32, in order to determine the shape of the food product being warmed and cooked, which is used to determine the laser deflection pattern for cooking.

From block 115 or block 125, control is transferred to block 130, where the laser deflection pattern will be calculated by the processor 32 using the information fetched from the RWM 37. The information used in block 130 includes the deflection pattern that the laser cooking apparatus will follow in order to carry out cooking. From block 130, control is transferred to blocks 135 to 160, where the processor 32 will use the information fetched from the RWM 37 of the printer P, in order to calculate the appropriate power, temperature, focus diameter, pulse frequency, laser beam speed, and electromagnetic (EM) wavelength. The information obtained in blocks 135 to 160 will be used to recalculate the requested laser deflection pattern in block 165, to carry out cooking. This information step is performed for every food product in the printer P.

A temperature control sub-routine 170 is entered depending if the electromagnetic radiation heating apparatus 8 is needed or not to warm the food product.

If the electromagnetic radiation heating apparatus 8 is not needed, control is transferred from block 170 to block 185.

If the electromagnetic radiation heating apparatus 8 is needed, control is transferred from block 170 to block 175. In block 175, the processor 32 will use the information fetched from the RWM 37 of the printer P in order to determine the power required by the electromagnetic radiation heating apparatus 8 to warm the food product. Then, control is transferred from block 175 to block 180, where the processor 32 will activate the electromagnetic radiation heating apparatus 8 in order to warm the food product.

From block 170 or block 180, control is transferred to block 185, where the processor 32 will activate the laser beam in order to proceed with cooking. The laser beam is activated based on the set up defined in blocks 130-165.

From block 185, control is transferred to block 190, where the processor 32 will provide instructions to the controller 33 to move the laser beam following the laser deflection pattern recalculated in block 165, in order to cook the food product.

A control sub-routine 195 is entered depending if the electromagnetic radiation heating apparatus 8 is activated or not in order to warm the food product.

If the electromagnetic radiation heating apparatus 8 is not activated, control is transferred from block 195 to block 205.

If the electromagnetic radiation heating apparatus 8 is activated, control is transferred from block 195 to block 200, where the processor 32 provides instructions to the controller 33 to shut off the electromagnetic radiation heating apparatus 8 once the food product has been warmed. A table is saved in the RWM 37 that includes for each food product the temperature at which it is cooked, the temperature to which it is warmed, and the apparatus parameters for obtaining the temperature. The cooking temperature is related to different apparatus parameters, including power, time, frequency, spot diameter, wavelength, and pattern. The apparatus parameters will depend on the characteristics of the cooking process for each food product. Specifically, the beam spot diameter has two main functionalities: (1) adaptation to the layer diameter for printed-food and surface/volume for non-printed food and (2) control the temperature by controlling the laser power with the laser beam diameter.

From block 195 or block 200, control is transferred to block 205, where processor 32 provides instructions to the controller 33 to shut off the laser beam once the food product has been cooked.

A control sub-routine 210 is entered depending if the cooking process has ended or not.

If the cooking process has not ended, control is transferred to block 135 to recalculate the apparatus parameters that control the heating and cooking process, as well as the laser deflection patterns, in order to complete the appropriate heating and cooking process for the food product.

OTHER IMPLEMENTATION DETAILS

1. Terms

The detailed description contained herein is represented partly in terms of processes and symbolic representations of operations by a conventional programmable data processing apparatus. The processes and operations performed by the programmable data processing apparatus include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure.

A "data packet" is a type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of steps executed by a programmable data processing apparatus and leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the programmable data processing apparatus.

It should be understood that manipulations within the programmable data processing apparatus are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user who interacts with the programmable data processing apparatus.

2. Hardware

It should be understood that various types of programmable data processing apparatus may be used with program modules constructed in accordance with the teachings described herein. It may prove advantageous to construct a specialized apparatus to perform the method steps described herein with hard-wired logic or programs stored in nonvolatile memory, such as read only memory.

3. Program

In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The foregoing system may be conveniently implemented in a program or program module(s) that is based upon the diagrams and descriptions in this specification. No particular programming language has been required for carrying out the various procedures described above because it is considered that the operations, steps, and procedures described above and illustrated in the accompanying drawings are sufficiently disclosed to permit one of ordinary skill in the art to practice the present invention.

Moreover, there are many types of programmable data processing apparatus, computer languages, and operating systems which may be used in practicing the present invention and therefore no detailed computer program could be provided which would be applicable to all of these many different systems.

Programming for carrying out the invention thus can be implemented by programmers of ordinary skill in the art without undue experimentation after understanding the description herein.

4. Product

The method in accordance with the present invention may be provided as a computer program product which may include a machine-readable medium having stored thereon instructions which may be used to program a programmable data processing apparatus (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions.

5. Components

Computer implementation optionally includes at least one conventional programmable data processing apparatus having a processor, memory, storage, input devices, and display devices. Where any block or combination of blocks is implemented by a programmable data processing apparatus, it is done optionally by conventional means, whereby one skilled in the art of computer implementation could utilize conventional algorithms, components, and devices to implement the requirements and design of the invention provided herein. However, the invention also includes any new, unconventional implementation means.

Modifications and variations of the above-described embodiments of the present invention are possible, as appreciated by those skilled in the art in light of the above teachings. For example, IR sensors can be included to measure the temperature of every spot of the surface of the food product 7 being warmed or cooked, so that granular control of the apparatus and a feedback loop can be achieved. Internal cameras that are part of the 3D scanner can be leveraged for machine vision, to provide information on the cooking process that can be used for additional control features. Also, the heat produced by the laser systems can be used to keep the cooking chamber at a temperature of about 45-50° C., which would both aid the cooking process (by reducing energy consumption) and keeping the food product warm. It is therefore to be understood that, within the scope of the appended claims and their equivalents, the invention may be practiced otherwise than as specifically described.

We claim:

1. A method of preparing a printed food product using apparatus for preparing a food product including:
   a cooking chamber;
   an additive layer manufacturing printer for printing a food product inside the cooking chamber;
   a laser cooking apparatus including at least one laser system configured to emit at least one laser beam adapted to heat a food product to its cooking temperature and means for deflecting and focusing the at least one laser beam, wherein each laser system includes one of a single laser and at least two lasers;
   memory having information stored therein, including a deflection pattern for the at least one laser beam and ingredient information of the food product;
   an electromagnetic radiation heating apparatus adapted to emit electromagnetic radiation to warm the food product inside the cooking chamber to a temperature below its cooking temperature; and
   a processor implementing computer program instructions for controlling a plurality of apparatus parameters of the at least one laser beam of the laser cooking apparatus, including focus, beam spot diameter, frequency, power, and speed and for implementing computer program instructions for controlling the electromagnetic radiation heating apparatus
   the method comprising the steps of:
   printing the food product in the cooking chamber using the additive layer manufacturing process;
   cooking the food product using the laser cooking apparatus, while the food product is being printed, by deflecting and focusing the at least one laser beam emitted by the laser cooking apparatus.

2. The method of claim 1, further comprising the step of:
   warming the food product using the electromagnetic radiation heating apparatus.

3. The method of claim 2, wherein the warming step includes using the processor to determine the power required by the electromagnetic radiation heating apparatus to warm the food product based on the ingredient information stored in the memory.

4. The method of claim 1, wherein the cooking step includes:
   using the processor to calculate the apparatus parameters for controlling the at least one laser beam based on the information stored in the memory;
   using the processor to adjust the laser beam deflection pattern based on the calculated apparatus parameters; and
   using the processor to control the laser cooking apparatus according to the calculated apparatus parameters and adjusted laser beam deflection pattern.

5. The method of claim 1, wherein in the step of using the processor to adjust the laser beam deflection pattern based on the calculated apparatus parameters, the at least one laser beam is deflected in two dimensions over a pre-determined area of the food product and in the volume of the cooking chamber.

6. The method of claim 1, wherein the food product is made up of different ingredients, and the laser cooking apparatus is adapted to emit laser beams of different frequencies, and in the step of using the processor to control the laser cooking apparatus according to the calculated apparatus parameters and adjusted laser beam deflection pattern, the processor determines the frequency to be used depending on the ingredient being cooked.

7. The method of claim 1, wherein the beam spot diameter of the at least one laser beam is adjustable, and in the step of using the processor to control the laser cooking apparatus according to the calculated apparatus parameters and adjusted laser beam deflection pattern, the beam spot diameter is adjusted to achieve a pre-determined cooking temperature for the food product.

8. The method of claim 2, wherein the electromagnetic radiation is infrared radiation, and wherein the warming step includes warming the food product using infrared radiation.

9. The method of claim 2, wherein the electromagnetic radiation is microwave radiation, and wherein the warming step includes warming the food product using microwave radiation.

10. The method of claim 1, wherein the food product is made up of different ingredients, and the laser cooking apparatus is adapted to emit laser beams of different frequencies, and the step of cooking the food product includes applying different deflection patterns of the at least one laser beam and emitting laser beams of different frequencies to different ingredients in the same food product.

* * * * *